United States Patent [19]
Winowiski et al.

[11] Patent Number: 6,113,974
[45] Date of Patent: Sep. 5, 2000

[54] ANIMAL FEED INCORPORATING REACTIVE MAGNESIUM OXIDE

[75] Inventors: Thomas S. Winowiski, Mosinee; Vicky L. Zajakowski, Stevens Point, both of Wis.

[73] Assignee: Lignotech USA, Inc., Rothschild, Wis.

[21] Appl. No.: 09/201,236

[22] Filed: Nov. 30, 1998

Related U.S. Application Data

[63] Continuation-in-part of application No. 08/723,215, Sep. 27, 1996, abandoned.

[51] Int. Cl.$^7$ ....................................................... A23K 1/00
[52] U.S. Cl. .................................. 426/635; 426/2; 426/74; 426/285; 426/807
[58] Field of Search ................................ 426/2, 74, 285, 426/635, 807

[56] References Cited

U.S. PATENT DOCUMENTS

| | | | |
|---|---|---|---|
| 3,035,920 | 5/1962 | Knodt et al. | 99/8 |
| 4,160,041 | 7/1979 | Schroeder et al. | 426/69 |
| 4,267,197 | 5/1981 | Sawhill | 426/69 |
| 4,775,539 | 10/1988 | Van de Walle | 426/74 |
| 4,798,727 | 1/1989 | Miller | 426/69 |
| 4,800,092 | 1/1989 | Miller | 426/69 |
| 4,857,332 | 8/1989 | Schricker | 426/442 |
| 4,943,301 | 7/1990 | Nagle | 23/313 |
| 4,952,415 | 8/1990 | Winowiski et al. | 426/285 |
| 4,957,748 | 9/1990 | Winowiski | 426/2 |
| 4,996,065 | 2/1991 | Van de Walle | 426/72 |
| 5,064,665 | 11/1991 | Klopfenstein et al. | 426/2 |
| 5,073,388 | 12/1991 | Miller | 426/74 |
| 5,264,227 | 11/1993 | Laroche et al. | 426/72 |
| 5,281,434 | 1/1994 | Winowiski et al. | 426/635 |
| 5,290,962 | 3/1994 | Ozdoba et al. | 554/156 |
| 5,378,471 | 1/1995 | Smith | 424/442 |
| 5,567,452 | 10/1996 | Rebhan | 426/72 |

FOREIGN PATENT DOCUMENTS

| | | |
|---|---|---|
| 1203414 | 4/1986 | Canada . |
| 1206368 | 6/1986 | Canada . |
| 0303477 | 2/1989 | European Pat. Off. . |
| 380151 | 9/1923 | Germany . |
| 2749108 | 11/1977 | Germany . |
| 02242897 | 9/1990 | Japan . |
| 1494295 | 12/1977 | United Kingdom . |
| 2131273 | 6/1984 | United Kingdom . |
| WO94/03073 | 2/1994 | WIPO . |

*Primary Examiner*—Chhaya D. Sayala
*Attorney, Agent, or Firm*—Andrus, Sceales, Starke & Sawall

[57] ABSTRACT

This invention relates to an animal feed composition and method of compounding animal feed utilizing a reactive grade of magnesium oxide as a lubricant, either alone or in combination with a binder such as a sulfonated lignin. The components are blended in proportions such that production efficiency and pellet durability can be increased simultaneously. One specific embodiment of the MgO lubricant comprises a mixture of 10% magnesium oxide and 90% lignosulfonate. The MgO lubricant is incorporated with the animal feed in an amount of from about 0.05% to about 0.2% on a dry weight basis.

25 Claims, 1 Drawing Sheet

ANIMAL FEED INCORPORATING REACTIVE MAGNESIUM OXIDE

CROSS REFERENCE TO RELATED APPLICATION

This application is a continuation-in-part of Ser. No. 08/723,215 filed Sep. 27, 1996, now abandoned.

BACKGROUND OF THE INVENTION

This invention relates to animal feeds, and more particularly to an improved animal feed composition and method of compounding animal feed utilizing a reactive magnesium oxide, in conjunction with a binder, as a lubricant in the extrusion of animal feed pellets.

Animal feeds are generally produced with low cost byproduct ingredients. These ingredients ate often dusty, unpalatable, of low density, and have inadequate nutrient profile. To correct these shortcomings, ingredients are combined into a mixture with the necessary vitamins, minerals, and amino acids to meet the nutrient requirements of the animals. This is normally accomplished by extrusion and/or compaction techniques to form pellets, blocks, or briquettes. Extrusion and compaction eliminate ingredient segregation, increase bulk density, reduce dust, mask unpalatable ingredients, and reduce wastage.

The pelleting process consists of proportioning ingredients to meet the desired nutrient specifications, mixing, conditioning the mixture with steam, and extruding the conditioned meal through a die. Resistance in the die provides compaction necessary to form the pellet. Different ingredients will affect the resistance to extrusion and thereby affect pellet durability and production efficiency. Low resistance may require a binding agent while excessive resistance may require a lubricant.

Commercial pellet binders may be added to animal feeds to help maintain the physical integrity of the feed pellets. Chemically reactive binders have been used, as set forth in U.S. Pat. No. 4,996,065 (Van de Walle). These binders rely on a mixture of metal oxides and phosphates which react during pelleting to produce a metal phosphate cement-type compound which sets and strengthens the pellet. Alternately, metal oxides have been combined with liquid molasses to form "gels" which lock ingredients together into a solid block, as described in Canadian Patent 1,206,368 (Graham).

Lignosulfonates have also been used as binders in the manufacture of animal feed pellets, as described in U.S. Pat. No. 3,035,920 (Knodt), Canadian Patent 1,203,414 (Ashore), and U.S. Pat. No. 5,281,434 (Winowiski). The trend has been to enhance the binding potency of the lignosulfonate to allow lower use of levels in the feed. This concentration has been at the expense of lubricity that often accompanied the less refined lignosulfonates.

Lubricants have been added to feeds to reduce resistance to extrusion and increase production efficiency. Examples of commonly used lubricants include fats, oils, gums, and talc. Reduction of resistance in the die is generally accompanied by loss of pellet hardness or durability due to reduced compression. This loss of physical strength ultimately leads to an increased percentage of pellets reverting to meal. Thus, the use of binders referred to previously in combination with lubricants correct this deficiency.

BRIEF SUMMARY OF THE INVENTION

It is an object of this invention to provide a novel lubricant to improve the efficiency of the manufacture of animal feed pellets.

It is another object of this invention to proportion the novel lubricant with a binder such that the lubricant will not have a negative impact on pellet integrity.

These and other objects of the invention are accomplished by an animal feed composition and method of compounding an animal feed utilizing a reactive magnesium oxide as a lubricant. The resulting feed will extrude with less resistance, as indicated by a reduction in extrusion amperage, and thereby produce a savings in electrical energy and die replacement cost. The lubrication properties of the reactive magnesium oxide will also produce a smoother extrusion with fewer interruptions caused by erratic amperage overloads. The smoother extrusion will also allow better optimization of the process and the addition of more process steam.

It is a further object of this invention to combine a reactive magnesium oxide as a lubricant with a sulfonated lignin material as a binder in proportions such that lubrication is achieved without loss of pellet durability. The sulfonated lignin material may be a lignosulfonate, a sulfonated lignin, or mixtures thereof. Also, the sulfonated lignin material may be in the form of a sodium, potassium, calcium, magnesium, lithium, or ammonium salt. The ratio of sulfonated lignin material to reactive magnesium oxide in such a blend may be from 1:1 to about 20: 1, with 9:1 being preferred.

Another object of this invention is to combine the reactive magnesium oxide lubricant with other auxiliary binding agents in addition to sulfonated lignin materials such as hemicellulose extract, gluten, bentonite, starch, and so on, such that lubrication is achieved without loss of pellet durability.

It is yet another object of this invention to combine a reactive magnesium oxide with other auxiliary lubricants such as cellulose gum, talc, fatty acids, polyethylene glycol, and so on, when such a combination may show advantage, e.g., if the nutrient formulation precludes higher levels of magnesium.

DETAILED DESCRIPTION OF THE INVENTION

Figure 1:
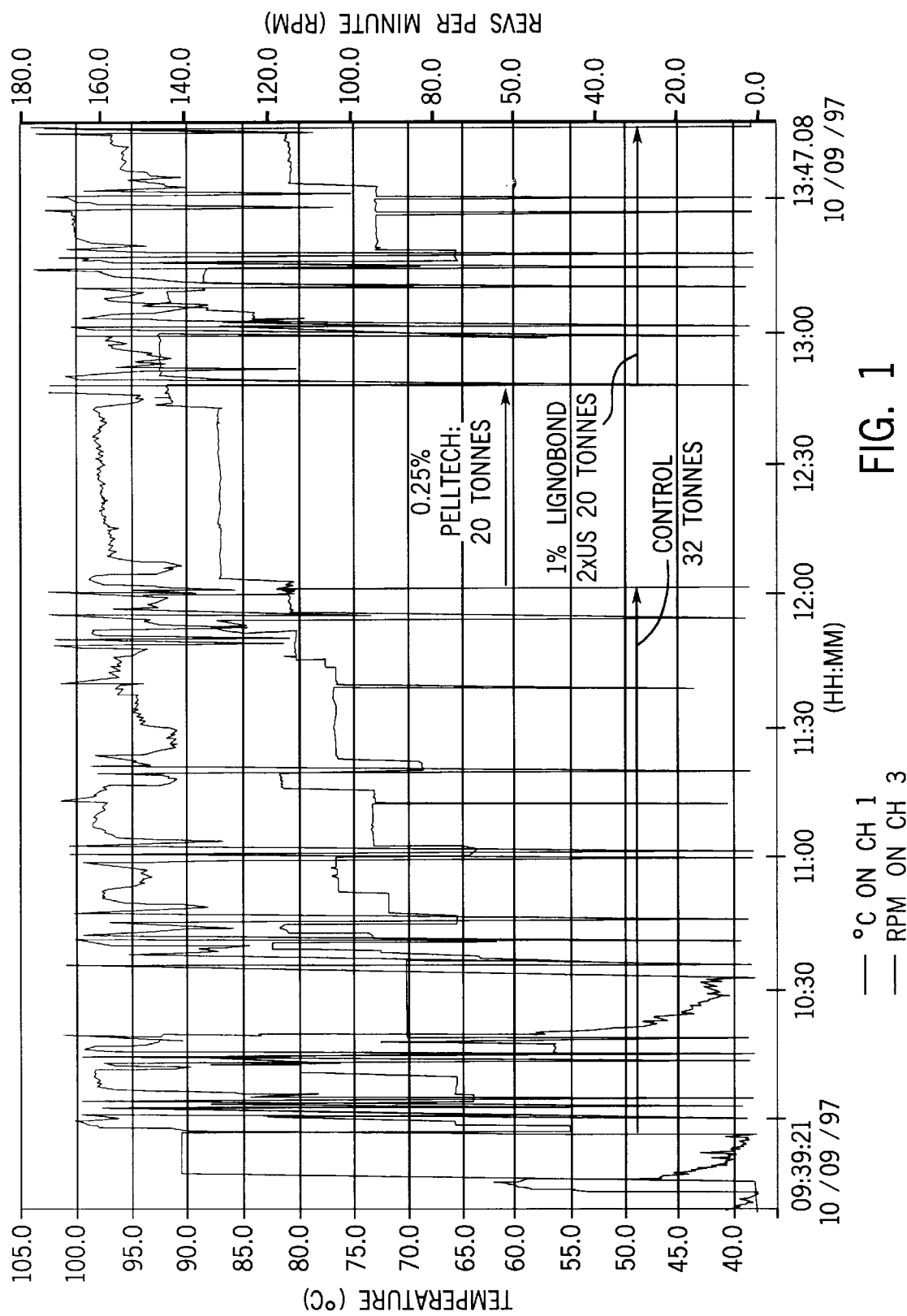
FIG. 1 is a graph illustrating extrusion motor load versus time for the three test feed lots of Example 11.

An animal feed composition and a method of compounding an animal feed utilizing a reactive magnesium oxide (MgO) as a lubricant during processing. The reactive MgO comprises a MgO having an activity index, as defined herein, of 100 seconds or less. The reactive MgO may be incorporated with the feed in an amount of from about 0.05% to about 0.2% on a dry weight basis.

The animal feed may be any protein, carbohydrate, mineral, or combination thereof, that is intended for feeding to animals. Examples would include soybean meal, corn, and dicalcium phosphate. These are typically combined to produce commercial feeds for poultry, swine, turkeys, ducks, and the like, as described in examples 6, 9, and 10. The lubricant may be added directly into the combined meal or added to a single ingredient which is then incorporated into the meal.

Any conventional binder typically used in animal feeds may be employed in amounts ranging from about 0.25% to about 2.0%. The preferred binder is a sulfonated lignin material, but hemicellulose extract, gluten, bentonite, starch, and the like may also be employed.

The sulfonated lignin material incorporated as a binder into the meal may be selected from a lignosulfonate, a sulfonated lignin, and mixtures thereof. As used herein, the term "lignin" has its normal connotation, and refers to the substance which is typically recovered from alkali pulping black liquors, such as are produced in the kraft, soda and other well known alkali pulping operations. The term "sulfonated lignin," as used in the specification, refers to the product which is obtained by the introduction of sulfonic acid groups into the lignin molecule, as may be accomplished by reaction of the lignin with sulfite or bisulfite compounds. As used herein, the term "lignosulfonate" refers to the reaction product of lignin which is inherently obtained during the sulfite pulping of wood, straw, corn stalks, bagasse and the like, and is a principle constituent of the spent sulfite liquor which is derived from that process. Finally, the phrase "sulfonated lignin material" encompasses both sulfonated lignin and lignosulfonate hereinabove described. Additionally, it should be noted that the sulfonated lignin material may be in the form of sodium, potassium, calcium, magnesium, lithium or ammonium salts without hindering its performance.

In a method of compounding feed for animals in accordance with the present invention, the reactive MgO compound utilized as a lubricant is incorporated with animal feed in an amount from about 0.05% to about 0.2% on a dry weight basis, and the mixture is then formed into a desired discrete shape for further processing and packaging. These discrete shapes may be referred to as pellets, cubes, blocks, wafers, crumbles, nuts, and so on, but shall all have in common the practice of extrusion against a resistance within the processing machinery. It should be particularly noted that levels of MgO less than about 0.05% results in little, if any, lubrication during processing. On the other hand, levels of MgO greater than about 0.2% are undesirable since excessive levels of dietary magnesium fed to poultry is cathartic, significantly decreases body weight, significantly increases mortality, and induces leg abnormalities. As a result, magnesium toxicity must be diligently monitored and avoided. Since basal diets normally contain some magnesium, an upper level of about 0.2% MgO, added as a lubricant, appears to represent an amount which will avoid magnesium toxicity in poultry.

Reactive magnesium oxides were determined in accordance with the present invention to be superior lubricants for processing animal feeds. Reactive magnesium oxides are those having an activity index of about 1 to 100 seconds, preferably about 1 to 20 seconds, and most preferably between about 15 seconds and 5 seconds. The "activity" of MgO refers to the time it takes for a definite phenolphthalein pink to be observed after combining prescribed amounts of MgO and acetic acid. This is more fully described in Example 2. Feed grade magnesium oxides are generally less reactive and demonstrate poor or no ability to lubricate.

Reactivity is largely determined by the manufacturing process. MgO is produced by calcining dolomitic limestone or magnesium rich brine. MgO grades are described as light burned (calcined at temperatures ranging from 1600–1800° F.), hardburned (calcined at 2800–3000° F.) or deadburned (calcined over 4000° F.). The lower the temperature of calcining the more reactive the resulting MgO is, and thus light burned MgO is the grade most desired for use as a lubricant in the present invention.

Particle size will also affect reactivity; smaller particles have greater surface area per unit of mass and are therefore more reactive. Activity indexing of MgO combines the influences of processing, particle size, and any other factors that might alter its reactivity rate.

The following examples will serve to demonstrate the advantages, and the practice of the invention. These examples are merely intended for illustration without in any way limiting the scope of the invention.

EXAMPLE 1

Comparison to prior art.

Magnesium oxide (MgO), mono ammonium phosphate (MAP) and lignosulfonate (LS) were evaluated in a corn soya (3:1) mixture. Additives were incorporated into the feed at 0.5% (w/w) in a $2^3$ factorial design. Responses measured were fines generated during simulated transport and extrusion amperage. Basal feed was run between each test batch to allow the die to purge any residual lubrication.

| Main and Interaction Effects of Three Pelleting Additives | | | | | |
|---|---|---|---|---|---|
| # | LS | MgO | MAP | Motor load, % | Fines % |
| 1 | 0 | 0 | 0 | 82.9 | 16.2 |
| 2 | 0 | 0.5 | 0 | 71.4 | 31.3 |
| 3 | 0 | 0 | 0.5 | 77.1 | 17.1 |
| 4 | 0 | 0.5 | 0.5 | 77.1 | 17.0 |
| 5 | 0.5 | 0 | 0 | 78.0 | 11.7 |
| 6 | 0.5 | 0.5 | 0 | 71.4 | 21.3 |
| 7 | 0.5 | 0 | 0.5 | 77.1 | 11.1 |
| 8 | 0.5 | 0.5 | 0.5 | 72.9 | 12.3 |

Addition of MgO (#2) was associated with reduced amperage and higher fines. Use of MAP in combination with MgO (#4) caused amperage to increase and brought pellet durability back to the control level; MAP was reacting with MgO to form a magnesium-phosphate cement. Formation of this compound destroyed the lubricity of MgO. When MgO was used in combination with LS (#6) the lubrication properties of MgO were maintained and pellet quality was returned to levels near those of the starting point.

This example confirms the reactivity between metal oxides and phosphates as described in U.S. Pat. No. 4,996,065 and their potential for use as pellet binders. It also shows that MgO alone can be an effective lubricant. Finally, it shows that LS can be used as a binder in combination with MgO to provide lubrication without loss of pellet quality. By proportioning the mixture of MgO to LS it should be possible to achieve any desired ratio of binding to lubricity.

EXAMPLE 2

Relation of reactivity to lubrication.

Samples of chemical grade and feed grade magnesia were compared for reactivity as follows. Acetic acid (100 ml of 1 N) was combined with 300 ml of distilled water and 7 drops of phenolphthalein indicator in a Waring blender at room temperature. Five grams of magnesia sample were added to this solution and the blender was immediately started (low speed). Exactly 10 seconds after addition of the magnesia a second aliquot of acetic acid was added (100 ml of 1 N). The time from this second addition to the point where a definite pink color was observed is defined as the "Activity Index" of the magnesia sample.

These samples were evaluated as lubricants in a corn/soya type feed. Test batches were prepared to include 0.1% magnesium oxide. Each test was bracketed by control batches with no magnesium oxide. Feed was conditioned to 75° C. prior to pelleting. Production rate was held constant throughout the investigation.

Load amperage was calculated as the difference between production amperage and idling amperage, i.e., the net amperage required to compress and extrude the pellets. Each test sample was compared to the two controls that bracketed it. Results were expressed as a percentage reduction of load amperage of the test sample versus the average load amperage of the two bracketing controls.

Reactive magnesium oxides (Activity Index <100 seconds) were superior lubricants. Feed grade magnesium oxides are generally less reactive and demonstrate lesser or little ability to lubricate.

Relation Between Reactivity and Lubrication

| Product | Supplier | Feed Use | Activity Index, seconds | Reduction in load amps, % |
|---|---|---|---|---|
| Magchem 50 | Martin Marietta | No | 4 | 17.5 |
| Magchem 35 | Martin Marietta | No | 8 | 15.4 |
| MagOx 98HR | Premium Services | No | 6 | 14.2 |
| MagOx 93HR | Premium Services | No | 8 | 11.5 |
| MagOx | Premium Services | Yes | 270 | 6.9 |
| MagChem 10 | Martin Marietta | No | >600 | 1.6 |
| BayMag | BayMag | Yes | >600 | -1.8 |
| AniMag | Martin Marietta | Yes | >600 | -5.3 |

EXAMPLE 3

Comparison to commercial lubricants.

Thirty batches of corn:soya (3:1) basal ration were prepared such that 0.5% LS was added to all odd numbered treatments. Various lubricants were also added to odd numbered batches at a rate of 0.05%. Lubricant batches were prepared in triplicate and arranged in randomized blocks. Even numbered batches contained basal ration only and had no LS and no lubricant. Even numbered batches acted as controls, to purge the mill from the previous treatment, and to measure residual treatment effects. Batches were pelleted on a pre-warmed CL Type 2 CPM mill fitted with a ¾" by 5/32" die. Feed was conditioned to 82° C. with 30 psi steam immediately before pelleting. Batches were run in immediate sequence without interruption. Conditioning temperature and production rate were held constant.

Comparison to Commercial Lubricants

| | Motor load, % | | Fines, % | |
|---|---|---|---|---|
| Treatment | 0.5% LS | Basal | 0.5% LS | Basal |
| No lubricant | 76.3 | 76.6 | 16.2 | 26.6 |
| MgO | 74.0 | 74.3 | 16.5 | 30.1 |
| Hercules Gum | 76.3 | 76.9 | 15.9 | 26.9 |
| AgriGum | 76.9 | 77.1 | 17.1 | 26.8 |
| Sodium Oleate | 76.0 | 75.4 | 16.4 | 27.3 |

Commercial lubricants (Hercules Gum and AgriGum) had no effect on amperage or fines. LS caused a significant reduction of fines but had no effect on amperage. MgO caused a small but significant reduction in amperage in both the batch it was contained in and the following basal treatment, indicating a residual lubrication effect. This residual effect was confirmed by a higher level of fines in the following basal treatment. Higher fines are caused when lower extrusion resistance reduces compression of the pellet and thereby reduces its internal strength. When LS was used as a binder in conjunction with MgO as a lubricant, a reduction in amperage occurred without an increase in fines.

EXAMPLE 4

Comparison to vegetable oil.

Thirty-nine batches of corn:soya (3:1) basal ration were divided into three groups of 13. Three treatments were tested in each group, in duplicate, such that each group started and ended with a basal mix and each test batch was followed by a basal mix.

Pelleting was done on a prewarmed CL-Type 2 CPM mill fitted with a ¾" by 5/32" die. For the first group of 13 batches meal was conditioned to 60° C. with 30 psi steam. Batches were run in immediate sequence at constant production rate and conditioning temperature. Temperature was increased to 74° C. for the second group of 13 and to 82° C. in the third group of 13. Production rate was also increased with temperature but remained constant within each group.

Effectiveness of a LS/MgO Blend

| | Motor load, % | | | Fines, % | | |
|---|---|---|---|---|---|---|
| Treatment | 60° C. | 74° C. | 82° C. | 60° C. | 74° C. | 82° C. |
| Basal | 97.1 | 94.9 | 93.1 | 26.9 | 29.8 | 29.1 |
| 1% Oil | 91.4 | 89.4 | 87.4 | 36.4 | 39.5 | 37.9 |
| 1% LS | 96.3 | 95.1 | 91.7 | 14.9 | 16.9 | 17.5 |
| 0.1% MgO + 0.9% LS | 85.7 | 82.6 | 84.6 | 22.3 | 23.3 | 20.6 |

Results indicate that MgO+LS was a more effective lubricant than vegetable oil. Furthermore, MgO+LS had fewer fines than the basal ration while fines were significantly increased when oil was used as the lubricating agent. Performance of MgO was not affected by temperature through the range of the test.

EXAMPLE 5

Preparation of MgOLS blends.

Sufficient lignosulfonate liquor (50% solids) was obtained to produce two batches of spray dried powder. The liquor was divided into two portions. The first was diluted to 25% solids and spray dried, after which MgO powder was added to made a 1:9 MgO:LS blend. MgO powder was also added to the second portion of liquor to make a 1:9 MgO:LS ratio (dry matter basis). This mixture was diluted to 25% solids and spray dried.

The resulting MgOLS powders, as well as LS without MgO, were added at 0.5% into a core: soya basal mix for pelleting trials. Each treatment was prepared and run in duplicate using a randomized block design. Basal ration with no additive was run between each treatment to purge the mill. Pellets were made on a CPM CL-Type 2 mill fitted with a 5/32" by ¾" die. Meal was conditioned to 70° C. with 30 psi steam immediately before pelleting. Production rate was held constant throughout the trial. Results indicate that MgO can compliment the lubricity which is sometimes seen with LS and that MgO is an affective lubricant whether added dry or added to liquid LS and then spray dried in combination.

| Affect of LSMgO Preparation Method | | |
|---|---|---|
| Treatment | Motor load, % | Average load, % |
| Basal ration | 79, 76, 76, 77, 76, 77, 73 | 76.3% |
| 0.5% LS | 71, 71 | 71.0% |
| 0.5% MgOLS (1:9) - dry blend | 67, 66 | 66.5% |
| 0.5% MgOLS (1:9) - liquid blend | 69, 66 | 67.5% |

EXAMPLE 6

Evaluation in a commercial duck pellet.

Pellets were made on a CPM Century mill fitted with a $^{10}$/$_{64}$" by 2¼" variable relief die and a 10 foot Scott conditioner. Conditioning temperatures and motor amperages were monitored continuously by Rustrak recording meters. Samples were collected directly off the die at 5 minute intervals and returned to ambient temperature by evaporative cooling under a stream of forced air. Pellet durability was determined on a tube-type tester. One hundred grams of sifted pellets were placed in each tube, together with two ¾" hex nuts. Tubes had a length of 35 cm and diameter of 7cm and were rotated end over end for 5 minutes at a rate of 30 revolutions per minute. Fines were measured as the percentage of the tumbled sample that sifted through a U.S. No. 8 sieve.

Production rate (tons/hour) was calculated as the total tons of feed divided by the total processing time. This calculation includes time that the mill was not producing due to chokes which interrupted production. MgO (0.125%) caused the mill to run smoother and there were no interruptions when it was incorporated into the feed mix. Inclusion of 1.125% LS was sufficient to maintain fines at a reasonably low level.

| Effect of Lubricant on Production Rate of a Duck Grower Pellet | | | |
|---|---|---|---|
| Treatment | Temp | Tons/Hour | Fines, % |
| 1.25% LS | 170 | 6.5 | 7.9 |
| 1.25% LS | 164 | 5.3 | 10.7 |
| 0.125% MgO + 1.125% LS | 169 | 7.1 | 8.4 |

EXAMPLE 7

Evaluation in a commercial poultry pellet.

This example demonstrates the effectiveness of 0.05% MgO in combination with other binding and lubricating additives.

Four 15 ton batches of broiler pellets were prepared to include No Binder, 0.5% LS, 0.5% LS:MgO: PEG (17:2:1 where PEG=polyethylene glycol), and a replicate of No Binder. Pellets were made on a 300 HP Buehler mill fitted with a 4 mm die in new condition. Feed was conditioned in a single pass horizontal cascade type conditioner. Conditioning temperature and motor amperage were monitored continuously with Rustrak recording meters. Samples were collected directly off the die at 5 minute intervals, cooled under a stream of forced air, screened, and tested for durability using a Holmen tester (30 seconds, 2 mm sieve). Feeder screw rate was recorded at the time of sample collection. Production rate was calculated based on the feeder screw rate.

The steam supply was limited in this pelleting system. When production rate was increased with LSMgOPEG there was insufficient steam to maintain temperature. Lower temperature would normally cause increased fines and slower production rate. In spite of lower temperature, production rate improved and fines were reduced with LSMgOPEG. The benefit would be even greater if sufficient steam had been available to maintain temperature.

| Increased Production Rate in a Broiler Pellet | | | | |
|---|---|---|---|---|
| Treatment | Conditioning Temp. | Production rate, TPH | Power, kWh/Ton | Fines, % |
| No Binder | 80.8 | 13.4 | 11.6 | 48 |
| 0.5% LS | 84.5 | 14.0 | 11.2 | 35 |
| 0.5% LSMgOPEG | 78.5 | 16.1 | 10.2 | 39 |
| No Binder | 83.0 | 13.0 | 11.7 | 41 |

EXAMPLE 8

Lubrication of feed containing phosphate.

Biofos, a monodicalcium phosphate available from IMCAgrico, was moistened in a pan granulator prior to addition of 5% MgO and 5% LS. When granulation was complete the resultant product was dried in an oven to remove excess moisture. The affect of this product on extrusion amperage was compared to that of Biofos alone, or with separate additions of LS:MgO blends.

Feed was pelleted on a CL Type 2 CPM mill fitted with a $^{5}$/$_{32}$" by 1½" die. The pelleting system was prewarmed.

Feed was conditioned to 75° C. by direct addition of 40 psi steam. Batches were run in immediate sequence. Temperature and production rate were held constant.

Amperage was recorded continuously with a Rustrak meter. Free running amperage was measured when the mill was operating but no feed was supplied to the die. The difference between free running amperage and maximum amperage is the potential working load. Amperage was measured at one minute intervals throughout each run, averaged, and reported as a percentage of the usable working load.

Results indicate that Biofos is an anti-lubricant, and that separate addition of LS:MgO is more efficient with regards to lubrication. However, direct combination of Biofos and LS:MgO is effective and may be useful where convenience of adding a single ingredient is important. Treatments and results are listed below.

| Treatment | % of Working Load |
|---|---|
| 1. Basal only (3:1 corn:soybean) | 63.3 |
| 2. Basal + 1.5% Biofos | 79.2 |
| 3. Basal + 1.5% Experimental Biofos | 66.3 |
| 4. Basal + 1.5% Biofos | 73.1 |
| 5. Basal + 1.5% Biofos + 0.1% MgO + 0.9% LS | 53.4 |
| 6. Basal + 1.5% Biofos + 0.05% MgO + 0.45% LS | 57.2 |

EXAMPLE 9

Lubrication of a commercial poultry pellet containing phosphate.

LS:MgO:PEG (17:2:1) was evaluated as a lubricant for a poultry grower ration containing Biofos, a monodicalcium phosphate manufactured by IMC-Agrico and which is known to cause an increase in amperage. Feed was conditioned to 82° C. with 80 psi steam immediately prior to pelleting. Pellets were made on a 30 HP CPM mill. Feeder screw rate was held constant between runs.

Replacement of Multifos (a tricalcium phosphate) with Biofos caused amperage to increase. Addition of 0.1% MgO to Biofos allowed it to match amperage with the more easily running Multifos source.

Lubrication of Phosphate Containing Feeds

| Formulation: | #3 | #7 | #1 |
|---|---|---|---|
| | Composition, % | | |
| Corn | 62.2 | 62.2 | 62.2 |
| SBM 48% | 31.0 | 31.0 | 31.0 |
| Biofos | 0.0 | 1.5 | 1.5 |
| Multifos | 2.2 | 0.0 | 0.0 |
| LSMgOPEG | 0.0 | 0.0 | 1.0 |
| Limestone | 0.4 | 1.4 | 1.4 |
| Salt | 0.25 | 0.25 | 0.25 |
| Vit. Premix | 0.50 | 0.50 | 0.50 |
| TM Z-10 | 0.10 | 0.10 | 0.10 |
| DL-Meth | 0.05 | 0.05 | 0.05 |
| SE Oil | 1.0 | 1.0 | 1.0 |
| | Production Response | | |
| MotorLoad, % | 36 | 40 | 36 |

EXAMPLE 10

Pellets were made on a CPM mill fitted with a 4 by 38 mm variable relief die. Conditioning temperatures and motor amperages were monitored continuously by Rustrak recording meters. Samples were collected directly off the die at 5 minute intervals and returned to ambient temperature by evaporative cooling under a stream of forced air. Pellet durability was determined on a Holmen tester (30 see, 2mm). Production rate was held constant at about 17 tons per hour during the trial. MgO was added at a rate of 0.05% on feed with 0.45% LS added as binder. The test ration was a broiler grower consisting of; corn, 55.3%; soya, 17%; fish meal, 7%; sesame meal, 3.1%; wheat pollard, 10%; oil 1.5%, and other, about 6%. Meal was conditioned to 87° C. by direct addition of 2 Bar steam.

MgO caused extrusion amperage to drop from 178 down to 164 while LS caused durability to increase from 44.0 to 54.5%. Results confirm that 0.5% LSMgO was able to both lubricate and bind.

Affect of Additive in Broiler Grower Pellets

| | Control | 0.5% LSMgO |
|---|---|---|
| Temp. ° C. | 86.2 | 85.9 |
| Tons/Hour | 17.0 | 17.0 |
| Amperage | 178 | 164 |
| KWh/Ton | 6.6 | 6.0 |
| Durability, PDI | 44.0 | 54.5 |

EXAMPLE 11

Seventy-two tons of broiler finisher were divided into three lots of 32, 20, and 20 tons and treated with no additive (See FIG. 1-control), 0.05% reactive grade magnesium oxide lubricant with 0.20% lignosulfonate binder (See FIG. 1-PellTech, a blend of MgO:LS (1:4)), and 1% lignosulfonate binder (See FIG. 1-LignoBond), respectively. Feed was processed on a 350 horsepower Buhler press fitted with a 4mm by 53 mm die. Meal was conditioned to 95° C. by direct addition of low pressure steam. The first 32 tons with no additive required 141 minutes to process (13.6 tons per hour); this run included 15 process interuptions in which high amperage forced the feeder screw to shut down. The second segment of 20 tons which included 0.05% reactive magnesium oxide lubricant was pelleted without interuption in 50 minutes (24 tons per hour). The third segment of 20 tons with 1% lignosulfonate was processed in 57 minutes (21 tons per hour) and included seven interuptions in production caused by high ameperage.

FIG. 1 illustrates this Example 11. It is clear that even at a relatively low level of 0.05%, the MgO added to the meal acts to lubricate and facilitate formation of the final feed mixture.

Various modes of carrying out the invention are contemplated as being within the scope of the following claims particularly pointing out and distinctly claiming the subject matter regarded as the invention.

We claim:

1. A method of compounding feed for animals, comprising the steps of:

providing an animal feed comprising an organic meal;

incorporating a binder with said animal feed wherein said binder is selected from the group consisting of a sulfonated lignin material, hemicellulose extract, gluten, bentonite and starch;

incorporating with said animal feed an effective amount of a lubricant to facilitate formation of a feed mixture, said lubricant comprised of a reactive magnesium oxide of about 0.05 percent to about 0.2 percent by weight of the total feed;

forming said mixture into a desired shape.

2. The method of claim 1 wherein said desired shape is formed by extruding said mixture.

3. The method of claim 1 wherein said reactive magnesium oxide has an activity index of about 1 to 100 seconds.

4. The method of claim 1 wherein said reactive magnesium oxide is a light-burn magnesium oxide.

5. The method of claim 1 further including the step of incorporating an auxiliary animal feed lubricant in said feed mixture.

6. The method of claim 5 wherein said auxiliary animal feed lubricant is selected from the group consisting of cellulose gum, talc, fatty acids and polyethylene glycol.

7. A method of compounding feed for animals, comprising the steps of:

providing an animal feed comprising an organic meal;

incorporating with said animal feed an effective amount of a binder to maintain physical integrity of a feed mixture, said binder comprised of a sulfonated lignin material of about 0.25% to about 2.0% by weight of a total feed;

incorporating with said animal feed an effective amount of a lubricant to facilitate formation of a feed mixture, said lubricant comprised of a reactive magnesium oxide of about 0.05% to about 0.2% by weight of the total feed; and forming said mixture into a desired shape.

8. The method of claim 7 wherein said desired shape is formed by extruding said mixture.

9. The method of claim 7 wherein said reactive magnesium oxide has an activity index of about 1 to 100 seconds.

10. The method of claim 7 wherein said reactive magnesium oxide is a light-burn magnesium oxide.

11. The method of claim 7 further including the step of incorporating an auxiliary animal feed binder in said feed mixture.

12. The method of claim 11 wherein said auxiliary animal feed binder is selected from the group consisting of hemicellulose extract, gluten, bentonite and starch.

13. The method of claim 7 further including the step of incorporating an auxiliary animal feed lubricant in said feed mixture.

14. The method of claim 13 wherein said auxiliary animal feed lubricant is selected from the group consisting of cellulose gum, talc, fatty acids and polyethylene glycol.

15. The method of claim 7 wherein the sulfonated lignin material and the reactive magnesium oxide are dry blended.

16. The method of claim 7 wherein the reactive magnesium oxide is mixed with a solution of sulfonated lignin material to form a wet blend, and thereafter the wet blend is dried prior to incorporation with said animal feed.

17. The method of claim 7 wherein the sulfonated lignin material is a lignosulfonate.

18. The method of claim 7 wherein the sulfonated lignin material and the reactive magnesium oxide is blended in a ratio of 9:1 respectively.

19. An animal feed composition, compounded according to the method of claim 1 or claim 9, comprising:

an organic meal;

an effective amount of a binder to maintain physical integrity of a feed mixture, wherein said binder is selected form the group consisting of a sulfonated lignin material, hemicellulose extract, gluten, bentonite and starch;

an effective amount of a lubricant to facilitate formation of a feed mixture, said lubricant comprised of a reactive magnesium oxide of about 0.05% to about 0.2% by weight of the total feed mixture.

20. The composition of claim 19 wherein said reactive magnesium oxide has an activity index of about 1 to 100 seconds.

21. The composition of claim 19 wherein said reactive magnesium oxide is a light-burned magnesium oxide.

22. The composition of claim 19 further including an auxiliary animal feed lubricant in said feed mixture.

23. The composition of claim 22 wherein said auxiliary animal feed lubricant is selected from the group consisting of cellulose gum, talc, fatty acids and polyethylene glycol.

24. The composition of claim 19 wherein the binder is a lignosulfonate.

25. The composition of claim 19 wherein the binder comprises a sulfonated lignin material, and the sulfonated lignin material and the reactive magnesium oxide is blended in a ratio of 9:1 respectively.

* * * * *